United States Patent
Solazzo et al.

(10) Patent No.: US 11,433,760 B2
(45) Date of Patent: Sep. 6, 2022

(54) ACTIVE APPARATUS FOR MODIFYING AERODYNAMIC PROPERTIES OF A VEHICLE

(71) Applicant: Röchling Automotive SE & Co. KG, Mannheim (DE)

(72) Inventors: Domenico Solazzo, Worms (DE); Peter Dill, Ingolstadt (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 208 days.

(21) Appl. No.: 16/918,264

(22) Filed: Jul. 1, 2020

(65) Prior Publication Data

US 2021/0001928 A1  Jan. 7, 2021

(30) Foreign Application Priority Data

Jul. 3, 2019 (DE) .................... 10 2019 118 006.6

(51) Int. Cl.
  *B60K 11/08* (2006.01)
  *B62D 35/00* (2006.01)

(52) U.S. Cl.
  CPC .......... *B60K 11/085* (2013.01); *B62D 35/005* (2013.01)

(58) Field of Classification Search
  CPC ....... B60K 11/04; B60K 11/08; B60K 11/085; B62D 35/00; B62D 35/005
  (Continued)

(56) References Cited

U.S. PATENT DOCUMENTS 10,322,664 B2 * 6/2019 Dill .................. B60Q 1/0035
10,870,344 B2 * 12/2020 Dill .................. B60Q 1/2661
(Continued)

FOREIGN PATENT DOCUMENTS

DE  202015105567 U1   3/2017
DE  102018101357 A1 * 7/2018 .............. F01P 7/048
(Continued)

OTHER PUBLICATIONS

German Search Report for corresponding DE 10 2019 118 006.6 dated Apr. 15, 2020, 7 pgs.
(Continued)

*Primary Examiner* — Jason S Daniels
(74) *Attorney, Agent, or Firm* — Rankin, Hill & Clark LLP

(57) ABSTRACT

An active apparatus for modifying aerodynamic properties of a vehicle, encompassing: a frame; a movable portion movable relative to the frame along a motion path; a transceiver to emit a transceiver signal and has a specified transceiver position relative to the frame; an antenna to receive the transceiver signal and arranged on the movable portion, an antenna signal, induced by a predetermined transceiver signal, of the antenna exhibiting a predetermined functional dependence dependent on a position of the movable portion along the motion path and on the transceiver position; a signal transmitting unit to emit a unit signal that is associatable with the antenna and carries information regarding the antenna signal, the transceiver configured to receive the unit signal; and a signal evaluation unit, the signal evaluation unit configured to determine the position of the movable portion along the motion path on the basis of the unit signal, the functional dependence, and the transceiver position.

13 Claims, 6 Drawing Sheets

(58) Field of Classification Search
USPC .......................................... 296/180.1, 180.3
See application file for complete search history.

(56) References Cited

U.S. PATENT DOCUMENTS

| | | | | |
|---|---|---|---|---|
| 2006/0286918 | A1* | 12/2006 | Vargas | F24F 13/1426 |
| | | | | 454/155 |
| 2011/0035119 | A1* | 2/2011 | Sandgren | B62D 35/00 |
| | | | | 701/1 |
| 2015/0298539 | A1 | 10/2015 | Solazzo | |
| 2018/0086199 | A1* | 3/2018 | Solazzo | G01R 33/07 |
| 2018/0163863 | A1* | 6/2018 | Ogawa | F16H 61/66259 |
| 2019/0367102 | A1* | 12/2019 | Haban | B62D 37/02 |
| 2020/0172058 | A1* | 6/2020 | Demetrio | F16D 65/847 |
| 2020/0215900 | A1* | 7/2020 | Kim | B60K 11/085 |

FOREIGN PATENT DOCUMENTS

| | | | | |
|---|---|---|---|---|
| DE | 102018207365 | A1 * | 11/2019 | |
| FR | 3095165 | A1 * | 10/2020 | ........... B60K 11/085 |

OTHER PUBLICATIONS

Espacenet Bibliographic data:DE 202015105567 (U1), Published Mar. 9, 2017, 1 pg.

* cited by examiner

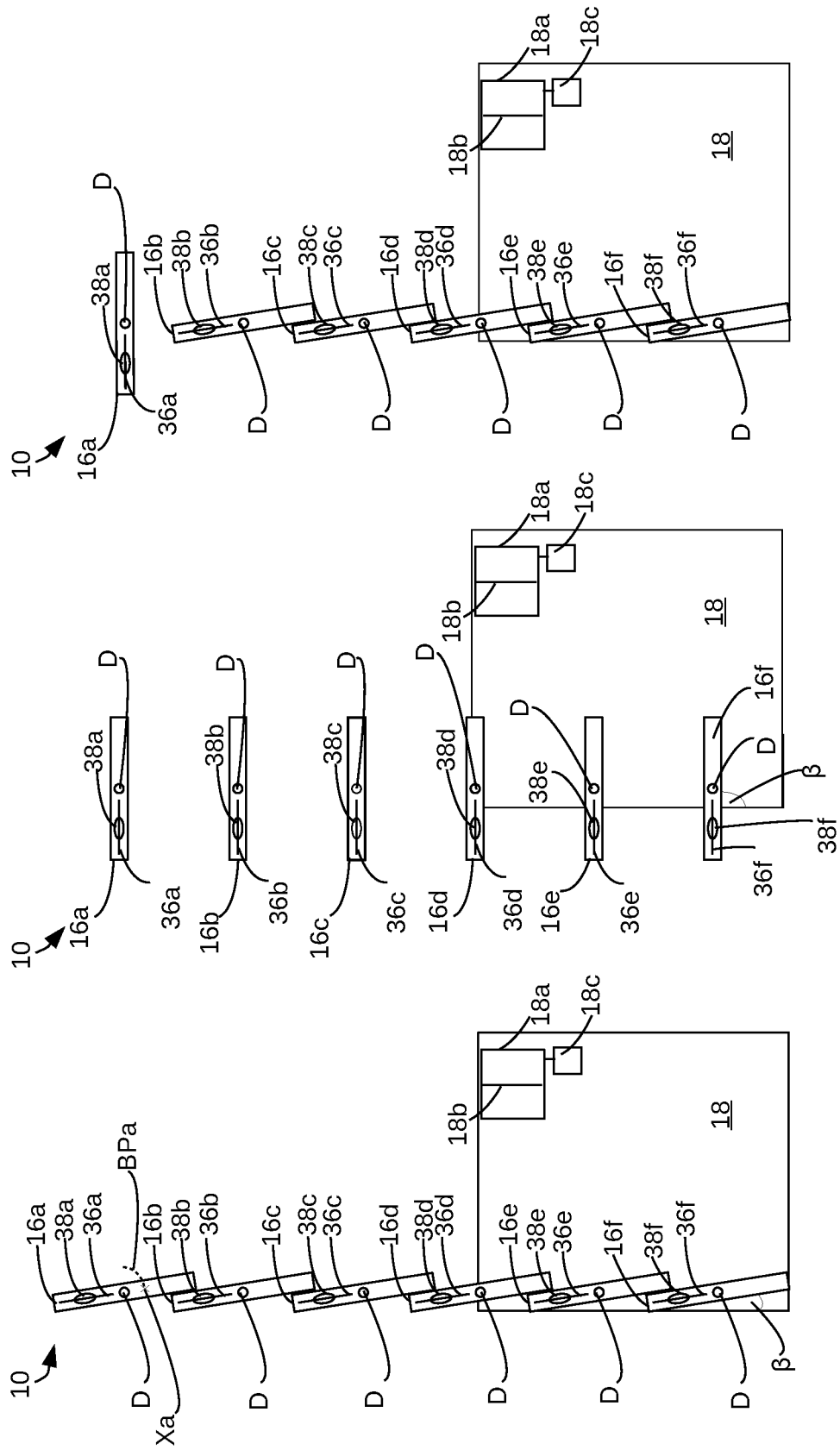

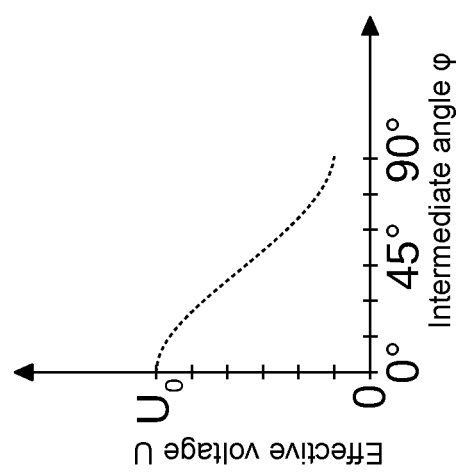

ACTIVE APPARATUS FOR MODIFYING AERODYNAMIC PROPERTIES OF A VEHICLE

This Application claims priority in German Patent Application DE 10 2019 118 006.6 filed on Jul. 3, 2019, which is incorporated by reference herein.

The present invention relates to an active apparatus for modifying aerodynamic properties of a vehicle.

BACKGROUND OF THE INVENTION

In order to reduce the $CO_2$ emissions of vehicles, it is known to increase the efficiency of the vehicle drive system and reduce the aerodynamic drag by adapting aerodynamic properties of the vehicle. If exclusively passive apparatuses are used to adapt aerodynamic properties, the reduction in aerodynamic drag is a compromise among automotive boundary conditions, such as a minimum cooling output over the performance spectrum to be achieved by the vehicle; an ability of the vehicle to move over irregularities; and the configuration of vehicle body components that can reduce aerodynamic drag.

In the present Application, a distinction is made between active and passive apparatuses for adapting aerodynamic properties. An active apparatus for adapting aerodynamic properties encompasses at least one actuator, to which control can be applied by a vehicle system or by a user and which can be in particular an actuator that is driven pneumatically, hydraulically, electrically, or that utilizes an internal combustion engine. Passive apparatuses for adapting aerodynamic properties differ from active ones in that they do not comprise an actuator to which control can be applied by a vehicle system or by a user. Examples of such passive apparatuses are permanently installed body components such as spoilers, diffusers, or guide vanes that move or deform, if at all, substantially only in response to the incident flow of air as the vehicle moves.

In order to allow the vehicle's aerodynamic drag to be reduced further when boundary conditions such as speed or outside air temperature permit, movable portions such as air flaps in a radiator grill, as depicted in DE 10 2014 207 566 A1, or directing portions of a ram air lip on a wheel to which control can be applied by a vehicle system or by a user, are used in the existing art.

Active apparatuses of this kind for modifying aerodynamic properties of vehicles are subject to a plurality of regulatory provisions, conformity with which often requires a direct measurement of the position of the movable portions of the apparatus. The wiring for the sensors used for that purpose increases the cost, complexity, and weight of such apparatuses. In addition, the wiring of sensors mounted on movable portions is subject to repetitive deformation, which can result in cable breakage.

SUMMARY OF THE INVENTION

An object of the present invention is therefore to furnish a simple and reliable active apparatus for modifying aerodynamic properties of a vehicle, having a movable portion whose position is determined; or to furnish a simple and reliable method for determining a position of the movable portion of such an apparatus.

This object is achieved according to the present invention respectively by an active apparatus according to Claim 1 and by a method according to Claim 10. Preferred embodiments of the invention are described in the dependent claims.

The active apparatus according to the present invention for modifying aerodynamic properties of a vehicle, in particular an air flap apparatus, particularly preferably an air flap apparatus having at least one pivotable air flap or a plurality of pivotable air flaps, encompasses: an apparatus frame; a first movable portion movable with respect to the apparatus frame along a first motion path; a transceiver that is configured to emit a non-wire-based transmitted transceiver signal and has a specified transceiver position with respect to the apparatus frame; a first antenna configured to receive the transmitted transceiver signal and arranged on the first movable portion for motion together therewith, a first antenna signal, induced by a predetermined transmitted transceiver signal, of the first antenna exhibiting a predetermined first functional dependence dependent on a position of the first movable portion along the first motion path and on the transceiver position; a first signal transmitting unit which is configured to emit a non-wire-based first transmitted signal-transmitting-unit signal that is associatable with the first antenna and carries information regarding the first antenna signal, the transceiver furthermore being configured to receive the first transmitted signal-transmitting-unit signal; and a signal evaluation unit, the signal evaluation unit being configured to determine the position of the first movable portion along the first motion path on the basis of the first transmitted signal-transmitting-unit signal, the first functional dependence, and the transceiver position. The first movable portion is preferably arranged relatively movably, in particular pivotably, on the apparatus frame. It is correspondingly possible to define a resting reference system which is stationary with respect to the apparatus frame and in which the first movable portion executes the motion along the first motion path. The first movable portion can be embodied as an air flap. A pivoting motion can encompass or be a rotational or rotary motion.

The information carried by the transmitted signal-transmitting-unit signal can be a measured value of the first antenna signal or of a first characteristic variable described below. The first functional dependence can preferably be described by a function which depends on the position of the first movable portion along the first motion path and on the transceiver position, and which associates with those variables a value of the first antenna signal or a value of the first characteristic variable. This function preferably bijectively maps, for a, preferably for each operationally provided, or in particular for each determined, transceiver position, the definition region of all possible positions of the first movable portion along the first motion path onto a value range of the values of the antenna signal or onto a value range of the values of the first characteristic variable. These value ranges can be determined experimentally. As a result of the above-described bijectivity of the function, the position of the first movable portion along the first motion path can be calculated by the signal evaluation unit from a determined transceiver position and from a measured value of the first antenna signal or of the first characteristic variable.

The predetermined transmitted transceiver signal is, for example, an electromagnetic wave of constant frequency which is emitted at a constant transmitted power level of the transceiver. The constant frequency is preferably in the frequency range from a few kilohertz, e.g. 3 kilohertz, to several gigahertz, e.g. 300 gigahertz.

The first movable portion can be an air flap which passes through a flowthrough opening and by way of whose relative motion an effective flowthrough-capable cross section of the flowthrough opening is modifiable. Alternatively or additionally, the movable portion can be a ram air lip, in particular a wheel ram air lip, that is modifiable in terms of its projection depth into an air flow.

Thanks to the use of non-wire-based signals, the apparatus is simplified due to the omission of leads for signal transfer between the transceiver and the first antenna, and the weight of the apparatus is also reduced as a result of that omission. The problem of fatigue breakage of signal leads to movable components is circumvented by the elimination of leads for signal transfer, so that signal transfer takes place reliably. Complex additional position sensors are furthermore omitted because a first antenna signal induced by a predetermined transmitted transceiver signal is used as an essential element for determining the position of the first movable portion along the first motion path, further simplifying the apparatus and also making it more reliable because of the lower component count.

If the active apparatus according to the present invention encompasses a plurality of movable portions, then at least one, all, or some of them can be embodied as pivotable air flaps. The pivotable air flaps preferably have parallel pivot axes or rotation axes. The movable portions, in particular the pivotable air flaps, can each have parallel motion paths. In particular, at least two of those pivot axes can be embodied non-collinearly. The active apparatus according to the present invention is arranged in particular in a passage through which ambient air flows in order to cool, for instance, an internal combustion engine, an electric motor, or a fuel cell. The active apparatus according to the present invention in particular can be arranged in, or can constitute, a radiator grill.

In case of doubt, the first motion path of the first movable portion can be described by the track of a first reference point, stationary during the motion, in the first movable portion. In the context of a rotary motion of the first movable portion, the reference point is to be selected at a distance from the rotation axis. In particular, the motion of the first movable portion is predetermined by its mounting on the apparatus frame. It can encompass or be a rotary motion and/or a translational motion. In case of doubt, the reference point is to be determined on a rigid portion of the first movable component. The position of the first movable portion along the first motion path can be described by the location of the first reference point in the track.

As described above, the active apparatus for modifying aerodynamic properties of a vehicle encompasses at least one actuator to which control can be applied by a vehicle system or by a user, in order to actively control the aerodynamic properties of a vehicle and thereby directly reduce $CO_2$ emissions.

The transceiver position of a transceiver mounted movably relative to the apparatus frame can be determined by a position sensor, for instance an optical sensor or incremental encoder, provided in the apparatus according to the present invention, and can be transferred by means of wire-based or non-wire-based signals to the signal evaluation unit for further processing. It is preferred, however, that the transceiver be arranged in stationary fashion on the apparatus frame, and that the transceiver position be made available to the signal evaluation unit for further processing directly as an unmodifiable parameter, or indirectly as a first functional dependence that, for that transceiver position, associates different positions of the first movable portion along the first motion path with values of the first antenna signal which change functionally depending on that position. The first functional dependence can be determined, as a calibration datum, by a calibration measurement of the first antenna signal as a function of the position of the first movable portion along the first motion path, and of the transceiver position. Because the functional dependence that results is substantially simpler, a transceiver position that is positionally invariable relative to the apparatus frame is preferred.

Non-wire-based signals as described in this Application are preferably signals transferred by means of electromagnetic waves, preferably in the frequency range from a few kilohertz, e.g. 3. kHz, to several gigahertz, e.g. 300 GHz. The same applies to signals, unless otherwise indicated in the context of the Application.

In particular, the first antenna signal is a current induced in the first antenna as a result of the electromagnetic interaction between the electromagnetic field of the non-wire-based transmitted transceiver signal and the first antenna, a measured value of that current, or a voltage measured at the first antenna or a measured value of that variable. The first antenna signal can likewise be a value derived from the aforementioned variables or measured values, for example an effective current or an effective voltage, or a power level absorbed or delivered by the first antenna. In particular, a first antenna signal is functionally dependent on an intensity of the transmitted transceiver signal at the location of the first antenna.

In a simple case, the first functional dependence dependent on a position of the first movable portion along the first motion path and on the transceiver position can depend only on the distance from the position of the transceiver to the first movable portion, in particular to the first antenna. The first antenna is preferably arranged on the first movable portion for motion together with it.

An antenna of the transceiver, in particular a transmitting transceiver antenna, and/or the first antenna, preferably each have an anisotropic directional characteristic that, because of the reciprocity that exists with antennas, describes substantially a directional characteristic of both the transmission and the reception of electromagnetic waves. The directional characteristic can comprise a dependence on the polarization of the emitted or received electromagnetic wave. The relative disposition between the transceiver or the antenna of the transceiver, and the first antenna, is preferably selected so that upon motion of the first movable portion along the first motion path, the first antenna is exposed to a varying intensity of the transmitted transceiver signal emitted by the antenna of the transceiver, that intensity being described in particular by an at least locally invertible function, in particular an invertible function, of the position of the first movable portion along the first motion path; and/or upon motion of the first movable portion along the first motion path, the transceiver or the antenna of the transceiver passes through solid angles as viewed from the first antenna, the first antenna having, for reception of electromagnetic waves from those solid angles, a reception sensitivity that changes depending on the respective solid angle. That reception sensitivity can be described by an at least locally invertible, preferably invertible, function of the position of the first movable portion along the first motion path.

In a preferred embodiment the apparatus can furthermore encompass a first antenna signal circuit that is electrically coupled to the first antenna and is configured to detect at least one first characteristic variable that is characteristic of the first antenna signal and is suitable as a basis for a determination of the position of the first movable portion along the first motion path, and is configured to emit the detected first characteristic variable in encoded fashion, preferably in digitally encoded fashion, as a first transmitted signal-transmitting-unit signal using the first signal transmitting unit. With such an apparatus, by suitably selecting the first antenna signal circuit it is possible to determine the characteristic variable accurately and/or robustly with respect to interference, which in turn results in a determination of the position of the first movable portion which is accurate and/or robust with respect to interference. The first antenna signal circuit is preferably arranged on or in the first movable portion. The antenna signal circuit is preferably part of an RFID chip or constitutes such a chip. The first signal transmitting unit emits the first transmitted signal-transmitting-unit signal preferably via an antenna of the antenna signal circuit which can be constituted by the first antenna.

If the first antenna is electrically coupled to a first electrical load in order to supply the first electrical load with energy, then in particular when power is transferred by the predetermined transmitted transceiver signal to the first antenna, the first characteristic variable for the first antenna signal can be a power level transferred from the first antenna to the first electrical load in the respective position of the first movable portion along the first motion path, in particular an effective value of that power level, which exhibits a high level of robustness with respect to interference. It is thereby possible to implement energy harvesting in particular for an electrical apparatus arranged on the first movable portion, and the power level obtained from the first electrical load can be utilized as a first characteristic variable for position determination. Systems with energy harvesting are designed in particular so that the load is capable either of directly converting the maximum power level to be expected in the context of energy harvesting, or of using that power level directly to charge an energy reservoir. If that is not the case, for example if a power controller but not an additional energy reservoir is connected between the first antenna and the first electrical load, the first characteristic value can then be a power level transferred from the first antenna to the first electrical load in the respective position of the first movable portion along the first motion path when the power controller is set for a maximum power transfer. The first electrical load, for instance an LED, an LED subassembly, or an antenna signal circuit, is preferably arranged on or in the first movable portion for motion together with it.

The first characteristic variable for the first antenna signal can also be a voltage tapped at the first antenna or a current flowing through the first antenna, in particular an effective value of that voltage or that current. A variable coupled directly to the transmitted transceiver signal can thereby be measured, so that secondary effects that distort a result can be very largely precluded. The first characteristic variable can be the first antenna signal itself. The first antenna signal can, in particular, be reconstructed and/or calculated from the first characteristic variable.

In a preferred embodiment, the apparatus encompasses a plurality n≥2 of movable portions, where n, and also the abbreviations for enumerations such as x, y, or z mentioned hereinafter, are in each case natural numbers. Hereinafter n always refers to the number of movable portions of the apparatus. The statements made just now and below for the first movable portion, the first antenna, the first antenna signal, the first motion path, the first functional dependence, the first signal transmitting unit, the first transmitted signal-transmitting-unit signal, the first antenna signal circuit, the first electrical load, and the first characteristic variable also apply mutatis mutandis to each y-th movable portion, each y-th antenna, each y-th antenna signal, each y-th motion path, each y-th functional dependence, each y-th signal transmitting unit, each y-th transmitted signal-transmitting-unit signal, each y-th antenna signal circuit, each y-th electrical load, and each y-th characteristic variable, for y such that 2≤y≤n, where y and n are in each case natural numbers.

The apparatus correspondingly preferably encompasses, for x where 2≤x≤n, an x-th movable portion movable along an x-th motion path; an x-th antenna configured to receive the transmitted transceiver signal and arranged on the x-th movable portion for motion together therewith, an x-th antenna signal, induced by the predetermined transmitted transceiver signal, of the x-th antenna exhibiting a predetermined x-th functional dependence dependent on a position of the x-th movable portion along the x-th motion path and on the transceiver position; an x-th signal transmitting unit which is configured to emit a non-wire-based x-th transmitted signal-transmitting-unit signal that is associatable with the x-th antenna and carries information regarding the x-th antenna signal; and the transceiver further being configured to receive the x-th transmitted signal-transmitting-unit signal; the signal evaluation unit being configured to determine, on the basis of the x-th transmitted signal-transmitting-unit signal, the x-th functional dependence, and the transceiver position, the position of the x-th movable portion along the x-th motion path, where 1-th is to be read as "first," 2-th as "second," etc.

In a preferred refinement of the invention, the apparatus preferably encompasses, respectively for x where 2≤x≤n, an x-th antenna signal circuit that is electrically coupled or connected to the x-th antenna and is configured to detect at least one x-th characteristic variable that is characteristic of the x-th antenna signal and is suitable as a basis for determining the position of the x-th movable portion along the x-th motion path, and is configured to emit the detected x-th characteristic variable in encoded, preferably digitally encoded, fashion, using the x-th signal transmitting unit, as an x-th transmitted signal-transmitting-unit signal.

The transceiver is preferably configured to exchange data with the first to n-th antenna signal circuits using a routing principle in such a way that using those data, the transceiver and/or the signal evaluation unit is configured to associate, for z where 1≤z≤n, the z-th transmitted signal-transmitting-unit signal with the z-th antenna and in particular with the z-th movable portion.

A routing principle in particular associates with each antenna signal circuit a unique identifier, for example a unique integer, which is transferred to the transceiver as part of or together with the transmitted signal-transmitting-unit signal and enables the unique association of the transmitted signal-transmitting-unit signal with the z-th antenna. A routing principle can be embodied in particular as a network protocol that, in particular, is routing-capable.

The individual antenna signal circuits (first, second, . . . , n-th antenna signal circuit) preferably constitute, with the transceiver, a network with cordless and wireless signal transfer between each one of the antenna signal circuits and the transceiver, and preferably with cordless and wireless signal transfer between each two circuits from among the antenna signal circuits. In the network, the data sent by the antenna signal circuits are preferably uniquely associatable with the associated antennas, i.e. those located on the same movable portion as the respective antenna signal circuit. From that association the signal evaluation unit can associate, for instance, the y-th characteristic variable, which is encoded in the y-th transmitted signal-transmitting-unit signal, with the y-th antenna, and can reconstruct the y-th antenna signal therefrom; and that y-th antenna signal can then be used to determine the position of the y-th movable portion, for y where 1≤y≤n, where y and n are each natural numbers. The wireless network can conform to one of the IEEE 802.11 standards, to a ZigBee standard, or to another standard for cordless and wireless networks.

In order to simplify production and reduce cost, the y-th antenna signal circuit and/or the y-th antenna and/or the y-th electrical load is arranged on or in the y-th movable portion, preferably using an injection molding method, in particular is molded on or injection-embedded, for y where 1<y<n, where y and n are each natural numbers.

The transceiver can be embodied as part of an actuator of the first movable portion and/or of the second, and/or third, . . . , and/or n-th movable portion, or as part of a control unit, for example an LED control unit, in order to assign a dual function to such a unit so that separate furnishing of an energy supply, a data bus, or similar arrangements can be dispensed with.

The invention furthermore furnishes a method for determining a position of a first movable portion, movable along a first motion path, of an apparatus for modifying aerodynamic properties of a vehicle, in particular of an active apparatus according to the present invention, described above, for modifying aerodynamic properties of a vehicle, particularly preferably of an air flap apparatus having at least one pivotable air flap or a plurality of pivotable air flaps, encompassing the steps of: emitting a non-wire-based predetermined transmitted transceiver signal; inducing, by way of the transmitted transceiver signal, a first antenna signal at a first antenna arranged on the first movable portion; emitting a non-wire-based first transmitted signal-transmitting-unit signal that is associatable with the first antenna and carries information regarding the first antenna signal; receiving, by way of the transceiver, the first transmitted signal-transmitting-unit signal; determining a position of the first movable portion along the first motion path based on the first transmitted signal-transmitting-unit signal, on a determined transceiver position, and on a predetermined first functional dependence dependent on a position of the first movable portion along the first motion path and on the transceiver position. This method preferably uses, in the context of its execution, an above-described active apparatus according to the present invention for modifying aerodynamic properties of a vehicle.

In a preferred embodiment, the method is to be utilized for a plurality n≥2 of movable portions, where n, and also the abbreviations for enumerations such as x, y, or z mentioned hereinafter, are natural numbers, the statements made above for the first movable portion, the first antenna, the first antenna signal, the first motion path, the first functional dependence, the first signal transmitting unit, the first transmitted signal-transmitting-unit signal, the first antenna signal circuit, the first electrical load, and the first characteristic variable also applying mutatis mutandis to each y-th movable portion, each y-th antenna, each y-th antenna signal, each y-th motion path, each y-th functional dependence, each y-th signal transmitting unit, each y-th transmitted signal-transmitting-unit signal, each y-th antenna signal circuit, each y-th electrical load, and each y-th characteristic variable for 2≤y≤n, where y and n are in each case natural numbers.

The advantages recited for the above-described apparatus according to the present invention for modifying aerodynamic properties of a vehicle generalize, mutatis mutandis, to the method just described.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein:

FIG. 5a is a schematic side view of the embodiment of FIG. 1, the air flaps being shown in the closed position and, for better clarity, not all elements of the embodiment of FIG. 1 being shown, and the position of the transceiver and of the elements received therein being symbolic;

FIG. 5b is the schematic side view of FIG. 5a, the air flaps being shown in the open position;

FIG. 5c is the schematic side view of FIG. 5a, with a malfunction of the air flap apparatus; and FIG. 6 shows a functional dependence for an induced effective voltage U, in units of a maximum voltage $U_0$ determined for the respective antenna, as a function of an intermediate angle $\varphi$ between an orientation direction of an air flap antenna and an orientation direction of the transmitting transceiver antenna.

DESCRIPTION OF PREFERRED EMBODIMENTS

Figure 1:
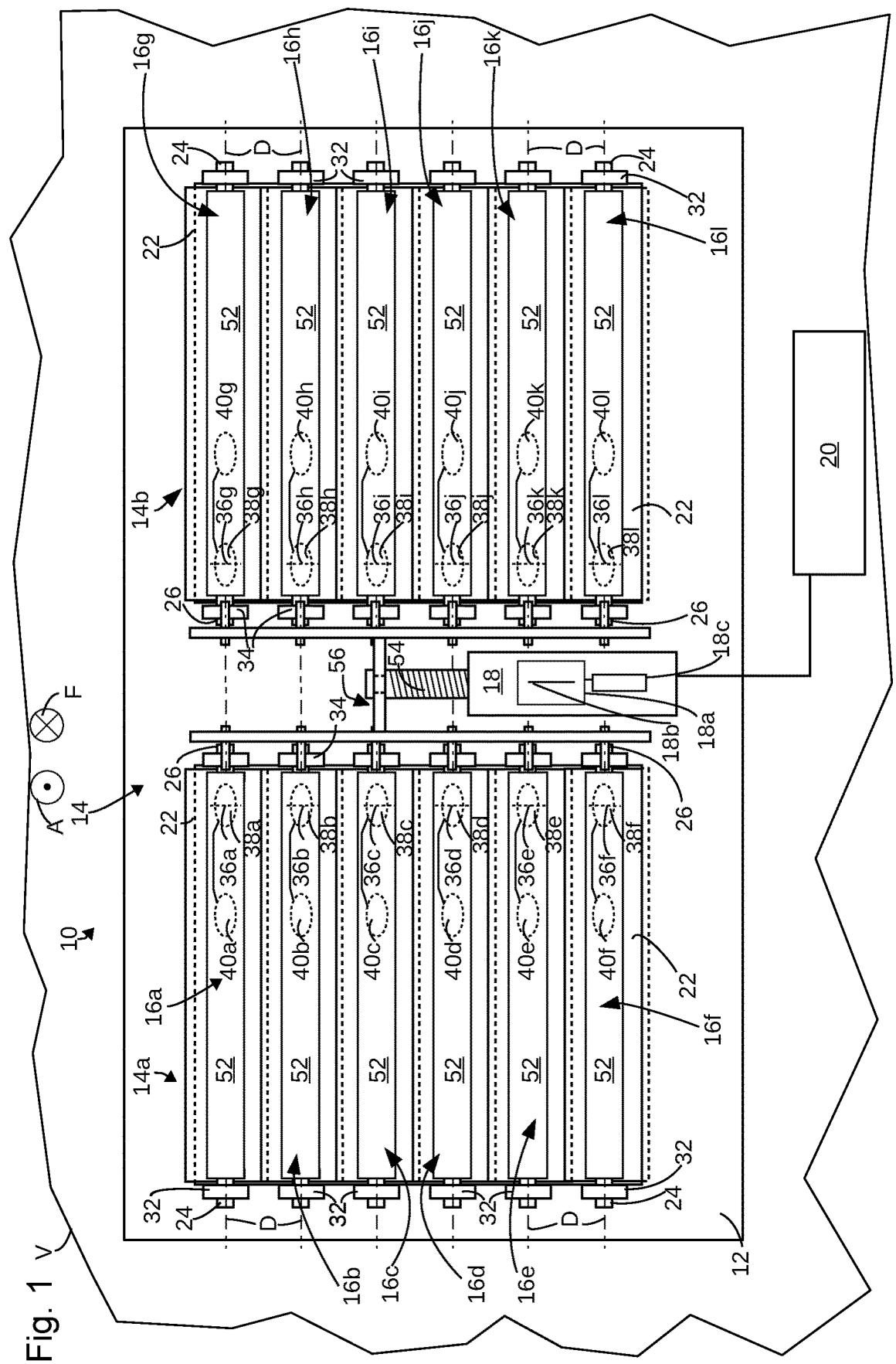
FIG. 1 is a schematic view of an embodiment of the present invention which is embodied as an air flap apparatus, the rear side facing away from the operational flow impingement side being shown with the air flaps in the closed position.

Referring now to the drawings wherein the showings are for the purpose of illustrating preferred and alternative embodiments of the invention only and not for the purpose of limiting the same. Moreover it is noted expressly that the Figures of the present Application are neither to scale nor accurate in terms of a relative motion of movable elements. The Figures serve merely to illustrate the principle of the present invention, and are correspondingly schematic in nature.

FIGS. 1 to 5c show an embodiment according to the present invention of an apparatus for modifying aerodynamic properties of a vehicle, which apparatus is embodied as an air flap apparatus for a motor vehicle V and is labeled in general with the number 10. Air flap apparatus 10 encompasses an apparatus frame 12 that is arranged preferably in stationary fashion, for example, with respect to a carrier element, embodied as a body portion, of vehicle V. Air flap apparatus 10 can be part of a radiator grill of vehicle V which is located on an outer side, impinged upon by wind blast, of vehicle V, in particular at the front of vehicle V in a forward travel direction F.

Apparatus frame 12 comprises a flowthrough opening 14 constituted by two partial flowthrough openings 14a and 14b. A plurality of substantially identical air flaps 16a to 16l are positioned, rotatably around rotation axes D, so as to penetrate the respective partial flowthrough openings 14a and 14b when viewed in a direction orthogonal to the drawing plane of FIGS. 1 and 2. Each of these air flaps 16a to 16l is an embodiment of a movable portion of apparatus 10 being described. Each of air flaps 16a to 16l moves, between a closed position shown in FIG. 1 and an open position shown in FIG. 2, by way of a rotary motion that can be described by the path of a reference point, not coincident with the rotation axis, of the respective air flap along a circle segment, whose center lies on the rotation axis and which proceeds parallel to a plane normal to the rotation axis. One such motion BPa of a point Xa is indicated for air flap 16a in FIG. 5a, point Xa in air flap 16a being selected. This pivoting motion or rotary motion of the respective air flap can be uniquely characterized by indication of an angle relative to a predetermined reference, e.g. apparatus frame 12.

Figure 2:
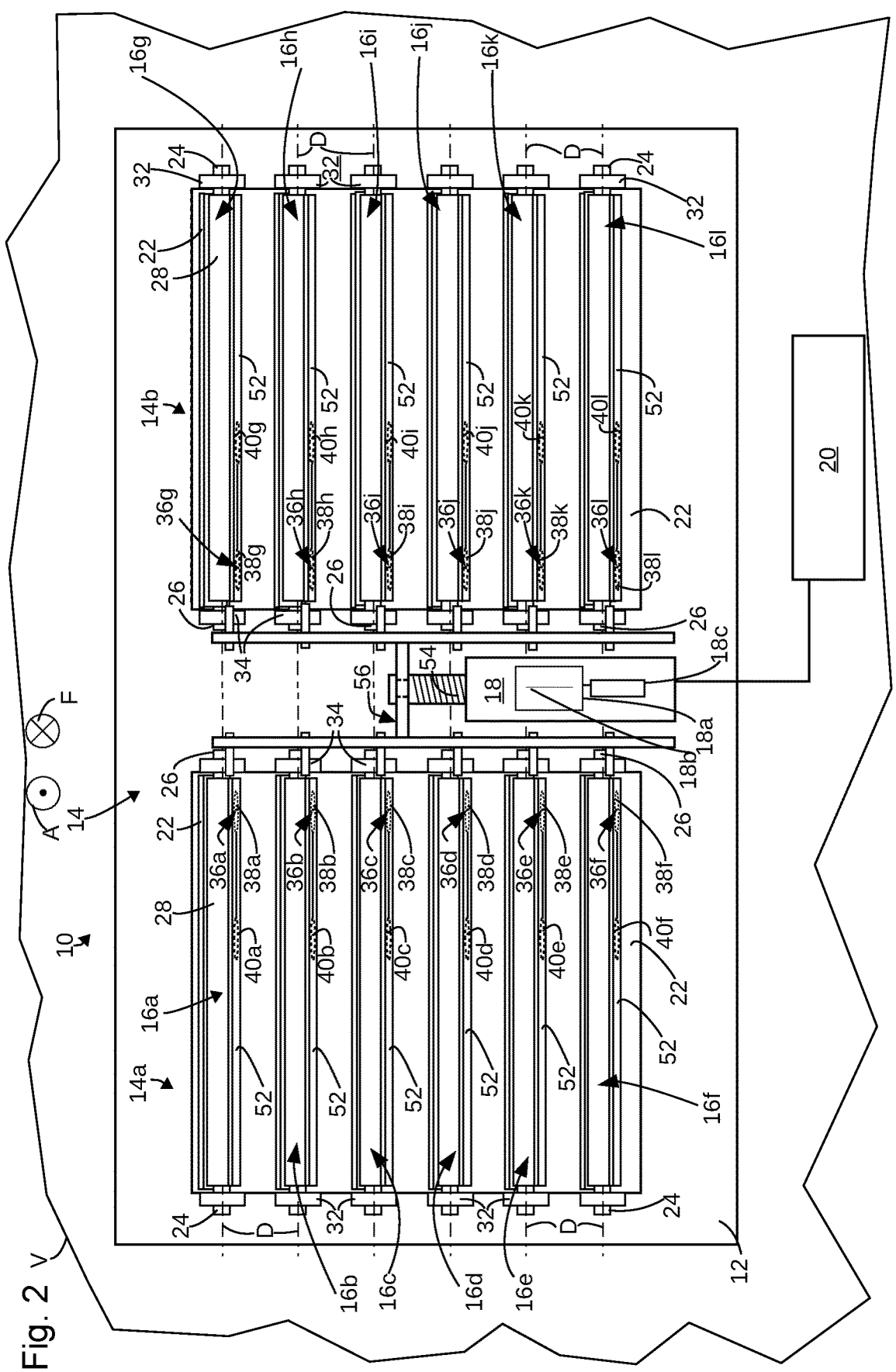
FIG. 2 shows the embodiment of the present invention of FIG. 1 in the same view as FIG. 1, with the air flaps in the open position.

In the interest of clarity, only individual rotation axes D are labeled with reference characters in some Figures. In addition, identical reference characters have been used in some cases for parts of air flaps 16a to 16l. It is nevertheless clear that all the air flaps of the present Application, if applicable regardless of any placement of antennas, circuits, electrical loads, and the like, are embodied as identical air flaps 16a to 16l. Air flaps 16g to 16l, which pass through partial flowthrough opening 14b on the right in FIGS. 1 and 2, are arranged as mirror images of air flaps 16a to 16f, which pass through partial flowthrough opening 14a to the left in FIGS. 1 and 2. In light of the symmetry condition that exists, it is therefore sufficient to describe in further detail only one of air flaps 16a to 16l—air flap 16a—and its mounting in apparatus frame 12, a description thereof likewise applying, given the aforesaid symmetry condition, to all other air flaps 16a to 16l of air flap apparatus 10 and to their mounting in apparatus frame 12.

Air flap apparatus 10 furthermore encompasses an actuator 18 in the exemplifying form of a spindle drive 54, to which control can be applied by a control apparatus 20 of air flap apparatus 10 for collective motion of air flaps 16a to 16l. Any other suitable actuator can be provided instead of spindle drive 54.

Apparatus 10 encompasses a plurality of twelve air flaps 16a to 16l constituting movable portions. The description below of air flap 16a and of its configuration, and the statements made below in connection therewith regarding the antenna signal, the motion path, the functional dependence, the signal transmitting unit, the transmitted signal-transmitting-unit signal, the antenna signal circuit, the electrical load, and the characteristic variable, also apply mutatis mutandis to the further air flaps and to their configuration and, for each individual one of those air flaps, to the respective antenna arranged on that air flap, to the respective signal transmitting unit arranged on that air flap, to the respective antenna signal circuit and/or electrical load arranged on that air flap, and to the associated antenna signal, the associated motion path, the associated functional dependence, the associated transmitted signal-transmitting-unit signal, and the associated characteristic variable.

Air flap 16a comprises an air flap blade 22 that is arranged eccentrically with respect to the respective rotation axis D. Rotation axis D of air flap 16a is defined by bearing studs 24 and 26 which protrude, coaxially with the longitudinal center of air flap blade 22, from a box-shaped, in the example cuboidal, bezel 28. Air flap blade 22, and bezel 28 connected integrally to it, can constitute a flap body 30 of air flap 16a.

Figure 3:
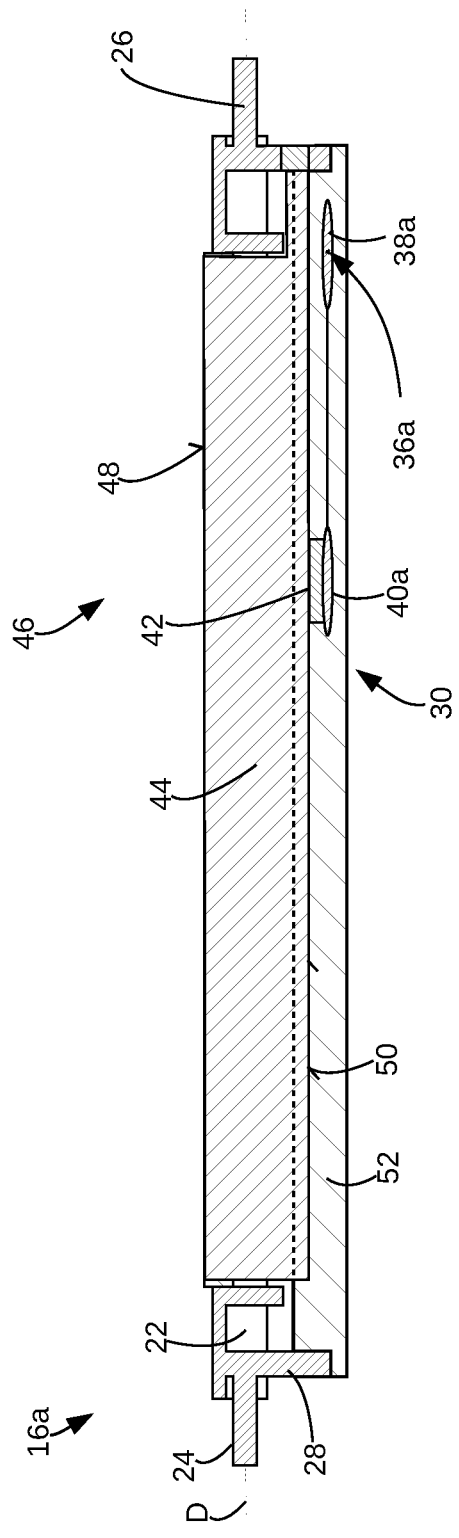
FIG. 3 is a schematic longitudinal section view of an air flap of the air flap apparatus of FIGS. 1 and 2.

Bearing studs 26 are clearly visible only in FIGS. 2 and 3.

Bearing studs 24 and 26 of air flap 16a pass through associated bearing brackets 32 and 34 that are provided in frame-mounted fashion on apparatus frame 12 for movable mounting of air flap 16a. Air flap 16a to 16l is thus uniquely determined in its location relative to the apparatus frame, its rotation axis D in particular being uniquely determined by bearing studs 24 and 26 and uniquely determined by bearing brackets 32 and 34 around which air flap 16a is displaceable by a rotation between its closed position shown in FIG. 1 and its open position shown in FIG. 2. Note that in order to improve the clarity of the Figures, not all bearing brackets 32 and 34, and bearing studs 24 and 26, are labeled with reference characters in the Figures. In the present example, the rotation axes of air flaps 16a to 16l lie, in the operational flow impingement direction A of the air flap apparatus, behind that portion in apparatus frame 12 which defines flowthrough opening 14. Flow impingement direction A is parallel to forward travel direction F of vehicle V, but oppositely directed. In the exemplifying embodiment depicted, flow impingement direction A is orthogonal to the drawing plane of FIGS. 1 and 2 and is directed toward the viewer; forward travel direction F of vehicle V is accordingly directed away from the viewer.

With air flaps 16a to 16l in the closed position shown in FIG. 1, vehicle V exhibits lower aerodynamic drag compared with the open position shown in FIG. 2 because a smoother flow-impinged surface is formed by air flaps 16a to 16l, so that aerodynamic properties of vehicle V are modified by the position of air flaps 16a to 16l. When air flaps 16a to 16l are in the closed position, the $CO_2$ emissions of the vehicle carrying apparatus 10 can then be reduced as compared with the state in which they are in the open position, operating parameters of the vehicle such as speed, acceleration, ambient temperature, power output of vehicle accessories such as a climate control unit, etc. being otherwise identical.

A specific configuration of the individual air flaps 16a to 16l can deviate from the embodiment described, as long as aerodynamic properties of vehicle V are modified by the position of air flaps 16a to 16l.

Actuator 18 can encompass a transceiver 18a that is configured to emit a non-wire-based predetermined transmitted transceiver signal as an electromagnetic wave having, for instance, a constant frequency of 2.4 GHz, at a constant power output of transceiver 18a. Optionally, transceiver 18a can be arranged in control apparatus 20. Transceiver 18a is preferably arranged in stationary fashion with respect to apparatus frame 12.

Provided on or in at least one of, preferably each of, air flaps 16a to 16l is a respective associated antenna 36a to 36l, configured to receive the transmitted transceiver signal and arranged for motion together with the respective air flap 16a to 16l, which antennas can also be referred to, for differentiation purposes, as air flap antennas 36a to 36l. It is noteworthy that not all air flap antennas 36a to 36l are labeled with reference characters in the Figures. An air flap antenna 36a will be respectively described below in conjunction with air flap 16a, but that description can be used, mutatis mutandis, for the features of each of air flap antennas 36a to 36l. This applies in particular to the description thereof in conjunction with the associated air flap 16a to 16l on which the respective air flap antenna 36a to 36l is arranged. Air flap antenna 16a is preferably arranged on air flap 16a for motion together therewith. When one of air flap antennas 36a receives the transmitted transceiver signal, the electromagnetic interaction with the transmitted transceiver signal induces, in that air flap antenna 36a, a voltage and a current whose amplitudes can depend, if applicable, on the interconnections of the respective air flap antenna 36*a* with other components. That induced voltage and that induced current, their amplitudes, and their effective values are respectively embodiments of an antenna signal.

In a simple exemplifying embodiment, air flap antenna 36*a* is a dipole antenna that can be described by a Hertzian dipole. The directional characteristic of a Hertzian dipole can be described, with reference to the intensity as a function of the polar angle $\theta$ having an intensity amplitude $I_0$, as $I_0 \cdot (1-\cos(\theta)^2)$, air flap antenna 36*a* being oriented in a direction $\theta=0°$ in a polar coordinate system that is fixed with respect to the air flap antenna. If air flap antenna 36*a* remains, upon motion of air flap 16*a* along the associated motion path, within a solid angle in which the intensity of the transmitted transceiver signal is constant, and if that air flap antenna 36*a* becomes rotated around rotation axes D during the motion, the amplitude of a voltage induced at air flap antenna 36*a*, and the amplitude of the induced current, reach a maximum when air flap antenna 36*a* is oriented so that the direction $\theta=90°$ (which is constant in the coordinate system that is fixed with respect to the air flap antenna but can change in a coordinate system that is stationary with respect to apparatus frame 12) points toward transceiver 18*a* or toward its transmitting transceiver antenna 18*b*. A minimum of those variables is reached when air flap antenna 36*a* is oriented so that the direction $\theta=0°$ points toward transceiver 18*a*. This functional dependence of the first antenna signal on an intermediate angle $\alpha$ between the alignment of air flap antenna 36*a* and the direction of a line proceeding from transceiver 18*a* to air flap antenna 36*a* can depend in particular on the distance between transceiver 18*a* and air flap antenna 36*a*, and thus on the position of transceiver 18*a*, since the electromagnetic radiation emitted from transceiver 18*a* always exhibits a divergence, and the power density per unit area thus decreases with increasing distance from transceiver 18*a*. In the interest of completeness, be it noted that the intermediate angle $\alpha$ is suitable for uniquely describing the rotational motion of air flap 16*a* carrying air flap antenna 36*a*, and thus the motion of air flap 16*a* along the associated motion path, so that this first functional dependence depends on a position of air flap 16*a* along the associated motion path and on the transceiver position. The polarization of the transmitted transceiver signal can be selected, for example by suitable rotation of the transceiver in the context of its arrangement on the apparatus frame, in such a way that when the direction $\theta=90°$ defined above points toward transceiver 18*a* or toward its transmitting transceiver antenna 18*b*, the amplitude of the first antenna signal lies, depending on the polarization that is selected (and preferably is maintained during the operation of apparatus 10) for the transmitted transceiver signal, in a desired value range, for instance so that a measurement range of an analog/digital converter that is described below in connection with an antenna signal circuit can be optimally utilized. It can be necessary in this context to discover, by experiment, a polarization of the transmitted transceiver signal such that the condition described for first air flap antenna 36*a* is satisfied, mutatis mutandis, for all air flap antennas 36*a* to 36*l*.

As air flap antenna 36*a* passes, in the context of the motion of the associated air flap 16*a* along the associated motion path, through solid angles with different transmitted transceiver signal intensities, which can be governed by the directional characteristics of a transmitting transceiver antenna 18*b*, both the directional characteristic of air flap antenna 36*a* and the directional characteristic of transmitting transceiver antenna 18*b* then influence the voltage induced at air flap antenna 36*a* or the current induced there, so that in this case as well, that functional dependence depends on a position of air flap 16*a* along the associated motion path and on the transceiver position.

Because a plurality of influences can influence the amplitude of the voltage induced at air flap antenna 36*a* or of the current induced there, it is preferred that the position of air flap 16*a* along the associated motion path be determined in a calibration measurement and that then, for a predetermined transmitted transceiver signal, the voltage or current induced at air flap antenna 36*a* be determined experimentally. An example of a functional dependence of this kind for an induced effective voltage U in units of a maximum voltage $U_0$ determined for the respective antenna, as a function of an intermediate angle $\varphi$ between the alignment direction of the respective air flap antenna 36*a* and the alignment direction of transmitting transceiver antenna 18*b*, is depicted in FIG. 6. If the respective air flap antennas 36*a* and transmitting transceiver antenna 18*b* are embodied as rod-shaped antennas, e.g. as dipole antennas, the respective alignment directions are coincident with the respective directions of extent of the antennas. In the interest of completeness, be it noted that when the position of the transceiver is known, the intermediate angle $\varphi$ in particular uniquely describes the position of air flap 16*a* along the associated motion path, since air flap 16*a* moves together with air flap antenna 36*a*. The value of the maximum voltage $U_0$ is determined in particular by the transmitted power level of the predetermined transmitted transceiver signal.

Note that the functional dependence shown in FIG. 6 is invertible over the angle range from 0 to 90°, i.e. a single intermediate angle $\varphi$ is associated with all values U from the mapped set of the functional dependence. This means that the intermediate angle $\varphi$ can be calculated from a measured induced effective voltage. If a measured value U lies outside the mapped set, the signal evaluation unit can identify an incorrect position of air flap 16*a* which deviates from a stipulated position of air flap 16*a*.

If the position of transceiver 18*a* and/or of its transmitting transceiver antenna 18*b* is modifiable, the above-described calibration measurement is then carried out for a plurality of positions. The resulting plurality of calibration measurements can be used, by way of an interpolation, to describe the functional dependence depending on $\varphi$ and on the position of transceiver 18*a* and/or on the position of its transmitting transceiver antenna 18*b*.

An associated antenna signal circuit 38*a* to 38*l* is preferably electrically connected or electrically coupled to each of antennas 36*a* to 36*l*; this is depicted merely schematically in the Figures.

A respective antenna signal circuit 38*a* will be described below in conjunction with air flap 16*a* and air flap antenna 36*a*; that description can be used, mutatis mutandis, for the features of each of antenna signal circuits 38*a* to 38*l*. This applies in particular to their description in connection with air flap 16*a* to 16*l* on or in which the respective one of antenna signal circuits 38*a* to 38*l* is arranged, and in connection with air flap antenna 36*a* to 36*l* that is arranged together with that antenna signal circuit 38*a* to 38*l* on or in that air flap 16*a* to 16*l*. Antenna signal circuit 38*a* and air flap antenna 36*a* are preferably arranged on or in air flap 16*a*.

Antenna signal circuit 38*a* is configured to detect, preferably via a digital/analog converter of antenna signal circuit 38*a*, the voltage induced at air flap antenna 36*a*, the current induced therein, the power level produced by the voltage and the current, or their effective values or amplitudes, as characteristic variables of the antenna signal induced at that air flap antenna 36a. Further characteristic variables are variables from which the antenna signal can be inferred, for example the voltage measured via a shunt in a lead connected to air flap antenna 36a. It is correspondingly possible to calculate from the characteristic variables, by way of the inference as to the associated antenna signal, the position of air flap 16a along its motion path. Preferably each antenna signal circuit 38a encompasses a microcontroller and a signal transmitting unit embodied as a transceiver, so that it encodes the specific characteristic variable in a digital signal with the aid of the microcontroller and, with the aid of the transceiver, transmits it either directly cordlessly and wirelessly to transceiver 18a, or at least in part cordlessly and wirelessly via a network with the aid of a network protocol. The network protocol can be routing-capable. By way of the network protocol, each signal transmitting unit preferably contains a unique identifier that can be conveyed to transceiver 18a, in particular, as part of the transmitted signal-transmitting-unit signal. The transmitted signal-transmitting-unit signal of the signal transmitting unit of antenna signal circuit 38 can thus be uniquely associated, by transceiver 18a or by a downstream signal evaluation unit 18c, with air flap 16a that carries antenna signal circuit 38a that encodes that specific characteristic variable in a digital signal, and that carries air flap antenna 36a electrically connected or coupled thereto.

Transceiver 18a receives the transmitted signal-transmitting-unit signal and transfers the information contained therein to signal evaluation unit 18c which, on the basis of the characteristic variable and that information, calculates the antenna signal. The transceiver position and the predetermined functional dependence for air flap 16a determined by the identifier are used for that purpose, the position of that air flap 16a along its motion path being capable of being calculated because of the invertibility of the functional dependence. Signal evaluation unit 18c can be embodied as a microcontroller.

Signal evaluation unit 18c can instruct transceiver 18a to transmit a command to antenna signal circuits 38a to 38l, or to their transceivers, to detect the characteristic variables of air flap antennas 36a to 36l associated with the antenna signal circuits, and then to emit the predetermined transmitted transceiver signal. Because transceiver 18a constitutes, with antenna signal circuits 38a to 38l, a preferably cordless and wireless network having a network protocol that can be routing-capable, transceiver 18a associates all received transmitted signal-transmitting-unit signals, via the unique identifier, with the respective air flaps 16a to 16l. On the basis of that association, signal evaluation unit 18c determines the position of each of air flaps 16a to 16l along the associated motion path.

Each antenna signal circuit 38a to 38l can be supplied with energy from the transmitted transceiver signal via energy harvesting, preferably utilizing air flap antenna 36a to 36l electrically coupled thereto. Each, or at least one, antenna signal circuit 38a can encompass for that purpose a rectifier electrically connected to air flap antenna 36a, and an energy reservoir, e.g. a capacitor, from which the respective antenna signal circuit can draw energy for its operation via associated leads. The capacitor is preferably charged via the rectifier that is supplied with energy from the air flap antenna. In a preferred embodiment, each, or at least one, antenna signal circuit 38a is embodied, in particular together with air flap antenna 36a electrically connected to it, as an RFID chip.

Each of antenna signal circuits 38a to 38l is an embodiment of an electrical load connected to the respective air flap antenna 36a to 36l that is to be supplied with energy. A further electrical load, e.g. an LED subassembly 40a to 40l, can be arranged on each of the air flaps. Once again, only LED subassembly 40a, and its configuration in conjunction with air flap 16a carrying that LED subassembly 40a and with antenna signal circuit 38a and antenna 36a, which are likewise arranged on air flap 16a, will be described, but that description is also to be applied, mutatis mutandis, to each of further air flaps 16b to 16l having antenna signal circuit 38b to 38l arranged on them, having air flap antenna 36b to 36l arranged on them, and having LED subassembly 40b to 40l arranged on them.

LED subassembly 40a is a further electrical load that is preferably connected in parallel with antenna signal circuit 38a. LED subassembly 40a can encompass an LED and a rectifier that is electrically connected to the LED and is electrically connected to air flap antenna 36a in order to be supplied with electrical energy by air flap antenna 36a via energy harvesting. This is indicated only schematically in the Figures. The power level of the transmitted transceiver signal is preferably designed so that in consideration of the efficiency of energy harvesting, all of the energy obtained by air flap antenna 36a from the transmitted transceiver signal is used and/or stored by the electrical load or loads connected to the respective air flap antenna 36a.

An LED of LED subassembly 40a can be coupled via an optical coupling element 42 to a diffuser 44 of air flap 16a that carries LED subassembly 40a, in order to deliver the light emitted by the LED out of air flap 16a. LED subassembly 40a can encompass a microcontroller and is preferably configured to switch the LED on and/or off and to receive, from the associated antenna signal circuit 38a, commands to switch the LED on and/or off. Antenna signal circuit 38a is configured to transfer instructions to switch the LED on and/or off to the associated LED subassembly 40a as a response to reception of corresponding instructions from a LED control device, the LED control device preferably encompassing a microcontroller and a transceiver and being part of the network. The LED control device can be part of control apparatus 20.

As shown in FIG. 3, diffuser 44 forms part of a flow impingement side 46 of air flap 16a. When the air flap is in the closed position, flow impingement side 46 faces in the travel direction of vehicle V. In bezel 28, diffuser 44 is covered along its back side 50, on the side facing away from its light output surface 48, by a cover 52 of flap body 30. Note that some of the details of air flap 16a shown in FIG. 3 are not shown, or labeled with reference characters, in the other Figures.

Air flap blade 22, bezel 28, diffuser 44, and cover 52 can constitute flap body 30 which, like each of air flaps 16a to 16l in its entirety as well, can be constituted using an injection molding method. During constitution using the injection molding method, air flap antenna 36a arranged on air flap 16a, antenna signal circuit 38a arranged on air flap 16a, and LED subassembly 40a arranged on air flap 16a can be molded on or placed by injection embedding.

Air flap antenna 36a can be electrically connected to antenna signal circuit 38a by a lead for transferring power and/or signal. Antenna signal circuit 38a can be electrically connected to LED subassembly 40a by a lead for transferring power and/or signal. Functional portions of antenna signal circuit 38a can be respectively connected to one another by associated leads for transferring power and/or signal; the same applies to functional portions of LED subassembly 40a. The same is correspondingly true for a connection between actuator 18 and control device 20, and for their functional portions.

In order to move air flaps 16a to 16l together along parallel motion paths between the closed position and open position by rotation around parallel axes, drive spindle 54 of actuator 18 is connected to a linkage 56 that drives air flaps 16a to 16l between those positions upon motion of drive spindle 54.

Figure 4:
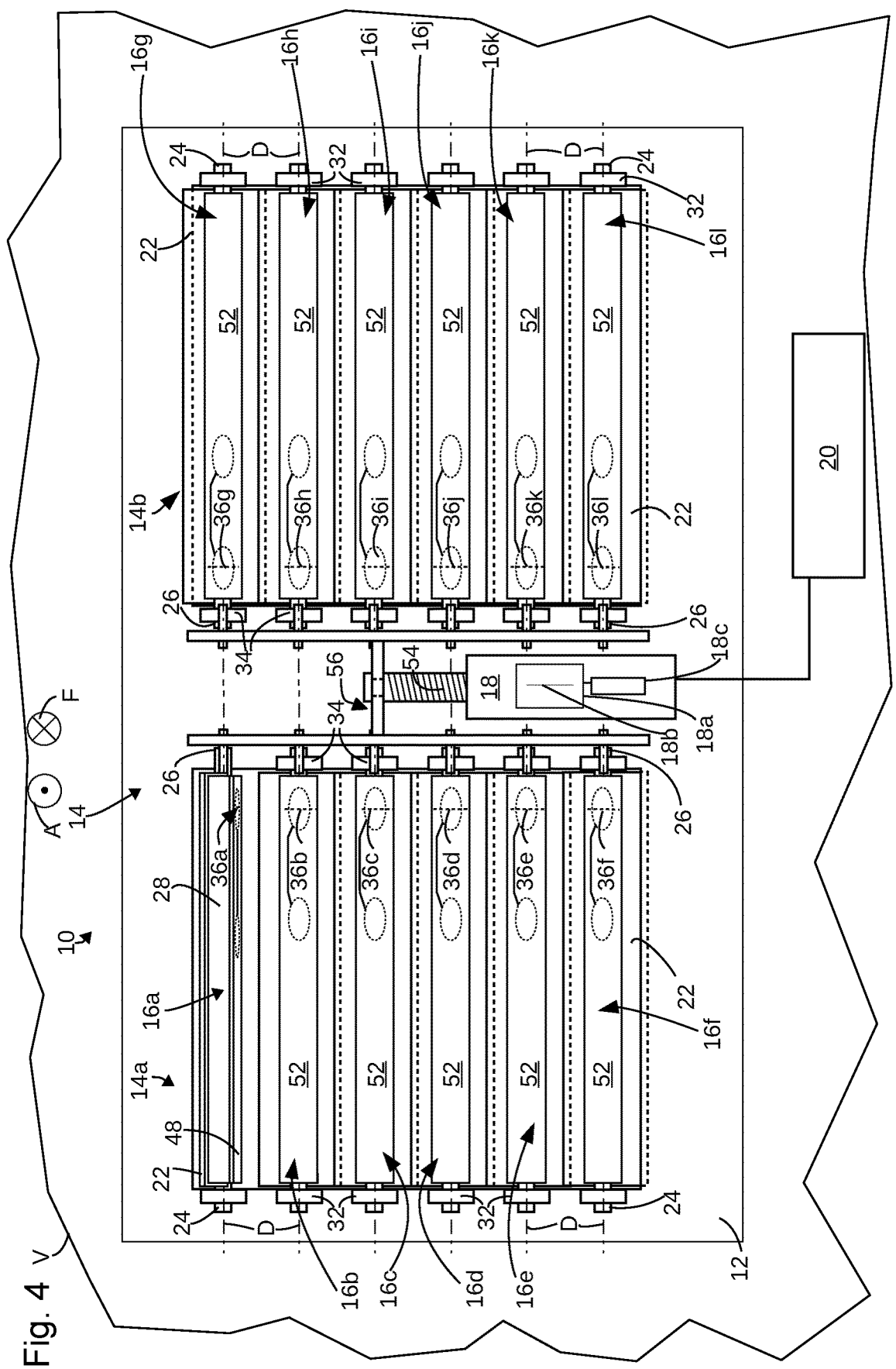
FIG. 4 shows the embodiment of the present invention of FIG. 1 in the same view as FIG. 1, with a malfunction of the air flap apparatus.

A method for determining a position of each of air flaps 16a to 16l along a motion path associated with the respective air flap 16a to 16l will be explained with reference to FIGS. 4 to 5c.

Signal evaluation unit 18c can instruct transceiver 18a to send to antenna signal circuits 38a to 38l, or to their transceivers, an instruction to detect the respective characteristic variables of the individual air flap antennas 36a to 36l respectively associated with one of antenna signal circuits 38a to 38l. Transceiver 18a is then instructed, in particular by signal evaluation unit 18c, to emit the predetermined non-wire-based transmitted transceiver signal, which in particular is an electromagnetic wave that is emitted at a constant transmitted power level and a constant frequency. That transmitted transceiver signal induces in each of air flap antennas 36a to 36l an antenna signal, for example an induced current or an induced voltage, associated with the respective air flap antenna 36a to 36l. Each of antenna signal circuits 38a to 38l detects, at air flap antenna 36a to 36l electrically coupled or connected to the respective antenna signal circuit 38a to 38l, preferably using an analog/digital converter of the antenna signal circuit, the effective voltage U, constituting a characteristic variable of the antenna signal, induced at that air flap antenna 36a to 36l by the transmitted transceiver signal. The measured value of that effective voltage is digitally encoded by antenna signal circuit 38a to 38l connected to that air flap antenna 36a to 36l, and is emitted as a transmitted signal-transmitting-unit signal that encompasses a unique identifier of air flap 16a to 16l that carries that antenna signal circuit 38a to 38l as well as air flap antenna 36a to 36l electrically coupled or connected to it. Transceiver 18a receives the respective transmitted signal-transmitting-unit signals from all the antenna signal circuits 38a to 38l and forwards them to signal evaluation unit 18c which, for each transmitted signal-transmitting-unit signal, determines the effective voltage and the unique identifier from the respective transmitted signal-transmitting-unit signal. Because the functional dependence, depending on the position of each air flap 16a to 16l along the motion path associated with that air flap and on the transceiver position, has previously been determined experimentally for each air flap, and is available to signal evaluation unit 18c, for example, in the form of a list or an interpolation curve, signal evaluation unit 18c calculates for all the air flaps, from the effective voltage U and its association with one of air flaps 16a to 16l and thus with a functional dependence associated with that air flap, the position of that air flap along the associated motion path. That calculation can occur numerically, e.g. with the aid of a bisection method.

A position, stipulated by control unit 20, of each of air flaps 16a to 16l can be conveyed by control unit 20, for example via a data bus, to signal evaluation unit 18c. These stipulated positions for the closed position can be described in FIG. 5c by an angle β of approximately 15° with respect to a perpendicular or with respect to apparatus frame 12. In order to maintain clarity, the angle has been shown for only one air flap in FIGS. 5a and 5b. Because all air flaps 16a to 16l are arranged parallel to one another in the position shown in FIG. 5a, and exhibit that angle with respect to the perpendicular or with respect to apparatus frame 12, signal evaluation unit 18c (or control unit 20, in a context of suitable data exchange) can, in a comparison step, compare the measured positions of the air flaps along the respective associated motion path with the respective stipulated positions and can determine that in the case shown in FIG. 5a, all air flaps 16a to 16l have assumed that stipulated position.

The consideration is analogous for the case shown in FIG. 5b, in which control unit 20 stipulates for air flaps 16a to 16l an angle β of approximately 90° with respect to the perpendicular or with respect to apparatus frame 12, in order to reach the open position.

In the case shown in FIG. 5c, control unit 20 stipulates for air flaps 16a to 16l an angle of approximately 15° with respect to the perpendicular, or with respect to apparatus frame 12, in order to reach the closed position; FIG. 4 also shows the situation shown in FIG. 5c. Air flap 16a, however, exhibits an angle β of approximately 90° with respect to the perpendicular or with respect to apparatus frame 12, while the further air flaps exhibit the stipulated angle of 15° with respect to the perpendicular. This can be caused, for example, by a detached bearing bracket 34 on air flap 16a, as depicted in FIG. 4. In the comparison step, signal evaluation unit 18c (or control unit 20 in a context of suitable data exchange) compares the measured positions of the air flaps along the respective associated motion path with the respective stipulated positions and determines that a malfunction of the apparatus exists in the case shown in FIG. 5c, since air flap 16a has not assumed the stipulated position. A malfunction of the apparatus can also be identified if a misalignment of one of the air flaps is identified.

The present invention has been described with reference to an air flap arrangement but can also be implemented, for example, in an apparatus having a ram air lip as a movable portion.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An active apparatus for modifying aerodynamic properties of a vehicle, in particular an air flap apparatus, having at least one pivotable air flap or a plurality of pivotable air flaps, encompassing:
   an apparatus frame;
   a first movable portion movable with respect to the apparatus frame along a first motion path;
   a transceiver that is configured to emit a non-wire-based transmitted transceiver signal and has a specified transceiver position with respect to the apparatus frame;
   a first antenna configured to receive the transmitted transceiver signal and arranged on the first movable portion for motion together therewith, a first antenna signal, induced by a predetermined transmitted transceiver signal, of the first antenna exhibiting a predetermined first functional dependence dependent on a position of the first movable portion along the first motion path and on the transceiver position;

a first signal transmitting unit which is configured to emit a non-wire-based first transmitted signal-transmitting-unit signal that is associatable with the first antenna and carries information regarding the first antenna signal, the transceiver furthermore being configured to receive the first transmitted signal-transmitting-unit signal; and a signal evaluation unit, the signal evaluation unit being configured to determine the position of the first movable portion along the first motion path on the basis of the first transmitted signal-transmitting-unit signal, the first functional dependence, and the transceiver position;

wherein the apparatus encompassing a first antenna signal circuit that is electrically coupled to the first antenna and is configured to detect at least one first characteristic variable that is characteristic of the first antenna signal and is suitable as a basis for a determination of the position of the first movable portion along the first motion path, and is configured to emit the detected first characteristic variable in encoded fashion as a first transmitted signal-transmitting-unit signal using the first signal transmitting unit;

the first antenna being electrically coupled to a first electrical load in order to supply the first electrical load with energy, and when power is transferred by the predetermined transmitted transceiver signal to the first antenna, the first characteristic variable for the first antenna signal being a power level transferred from the first antenna to the first electrical load, in particular an effective value of that power level.

2. The apparatus according to claim 1, wherein the apparatus further encompassing at least one actuator to which control can be applied by a vehicle system or by a user.

3. The apparatus according to claim 1, wherein the first characteristic variable for the first antenna signal being a voltage tapped at the first antenna, in particular an effective value of that voltage.

4. The apparatus according to claim 1, wherein the apparatus further encompassing:
 a second movable portion movable with respect to the apparatus frame along a second motion path;
 a second antenna configured to receive the transmitted transceiver signal and arranged on the second movable portion for motion together therewith, a second antenna signal, induced by the predetermined transmitted transceiver signal, of the second antenna exhibiting a predetermined second functional dependence dependent on a position of the second movable portion along the second motion path and on the transceiver position;
 a second signal transmitting unit which is configured to emit a non-wire-based second transmitted signal-transmitting-unit signal that is associatable with the second antenna and carries information regarding the second antenna signal; and
 the transceiver furthermore being configured to receive the second transmitted signal-transmitting-unit signal;
 the signal evaluation unit being configured to determine the position of the second movable portion along the second motion path on the basis of the second transmitted signal-transmitting-unit signal, the second functional dependence, and the transceiver position.

5. The apparatus according to claim 4, wherein the first antenna signal circuit and/or the first antenna being arranged on or in the first movable portion, and/or the second antenna signal circuit and/or the second antenna being arranged on or in the second movable portion.

6. The apparatus according to claim 4, wherein the transceiver being embodied as part of at least one of an actuator of the first movable portion, the second movable portion, a control unit and an LED control unit.

7. The apparatus according to claim 4, wherein the first antenna signal circuit and/or the first antenna being arranged on or in the first movable portion, and/or the second antenna signal circuit and/or the second antenna being arranged on or in the second movable portion, and being arranged by at least one of using an injection molding method, being molded on and being injection-embedded.

8. The apparatus according to claim 1, wherein the apparatus further encompassing:
 a second movable portion movable with respect to the apparatus frame along a second motion path;
 a second antenna configured to receive the transmitted transceiver signal and arranged on the second movable portion for motion together therewith, a second antenna signal, induced by the predetermined transmitted transceiver signal, of the second antenna exhibiting a predetermined second functional dependence dependent on a position of the second movable portion along the second motion path and on the transceiver position;
 a second signal transmitting unit which is configured to emit a non-wire-based second transmitted signal-transmitting-unit signal that is associatable with the second antenna and carries information regarding the second antenna signal;
 the transceiver furthermore being configured to receive the second transmitted signal-transmitting-unit signal;
 the signal evaluation unit being configured to determine the position of the second movable portion along the second motion path on the basis of the second transmitted signal-transmitting-unit signal, the second functional dependence, and the transceiver position;
 the apparatus encompassing a second antenna signal circuit that is electrically coupled to the second antenna and is configured to detect at least one second characteristic variable that is characteristic of the second antenna signal and is suitable as a basis for a determination of the position of the second movable portion along the second motion path, and
 is configured to emit the detected second characteristic variable in encoded fashion, as a second transmitted signal-transmitting-unit signal using the second signal transmitting unit, the transceiver being configured to exchange data with the first antenna signal circuit and with the second antenna signal circuit using a routing principle in such a way that using those data, the transceiver and/or the signal evaluation unit is configured to associate the first transmitted signal-transmitting-unit signal with the first antenna and the second transmitted signal-transmitting-unit signal with the second antenna.

9. The apparatus according to claim 8, wherein the second antenna signal circuit is configured to emit the detected second characteristic variable in a digitally encoded fashion.

10. The apparatus according to claim 1, wherein the first antenna signal circuit and/or the first antenna being arranged on or in the first movable portion.

11. The apparatus according to claim 1, wherein the transceiver being embodied as part of at least one of an actuator of the first movable portion, a control unit and an LED control unit.

12. The apparatus according to claim 1, wherein the first antenna signal circuit is configured to emit the detected first characteristic variable in a digitally encoded fashion.

13. The apparatus according to claim 1, wherein the first antenna signal circuit and/or the first antenna being arranged on or in the first movable portion and being arrange by at least one of an injection molding method, molding on and injection-embedding.

\* \* \* \* \*